(12) United States Patent
Andriolo et al.

(10) Patent No.: US 12,265,399 B2
(45) Date of Patent: Apr. 1, 2025

(54) AUTOMATIC WORK SYSTEM AND TURNING METHOD THEREFOR, AND SELF-MOVING DEVICE

(71) Applicant: Positec Power Tools (Suzhou) Co., Ltd., Suzhou (CN)

(72) Inventors: Paolo Andriolo, Vicenza (IT); Federico Testolin, Vicenza (IT); Davide Dalfra, Vicenza (IT); Emanuel Conti, Vicenza (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 17/764,525

(22) PCT Filed: Nov. 26, 2019

(86) PCT No.: PCT/CN2019/120977
§ 371 (c)(1),
(2) Date: Sep. 19, 2022

(87) PCT Pub. No.: WO2021/047063
PCT Pub. Date: Mar. 18, 2021

(65) Prior Publication Data
US 2024/0134394 A1 Apr. 25, 2024
US 2024/0231388 A9 Jul. 11, 2024

(30) Foreign Application Priority Data
Sep. 10, 2019 (CN) .......................... 201910863810.2

(51) Int. Cl.
*A01D 34/00* (2006.01)
*A01D 101/00* (2006.01)
(Continued)

(52) U.S. Cl.
CPC ......... *G05D 1/6482* (2024.01); *A01D 34/008* (2013.01); *G05D 1/2246* (2024.01); *A01D 2101/00* (2013.01)

(58) Field of Classification Search
CPC .. G05D 1/6482; G05D 1/2246; G05D 1/0274; G05D 1/0219; G05D 1/0255;
(Continued)

(56) References Cited

U.S. PATENT DOCUMENTS 6,809,490 B2 * 10/2004 Jones ................... G05D 1/0219
318/568.17
11,582,903 B1 * 2/2023 Brown ................. B60W 40/02
(Continued)

FOREIGN PATENT DOCUMENTS

| CN | 106983460 A | 7/2017 |
| CN | 107063257 A | 8/2017 |

(Continued)

OTHER PUBLICATIONS

First Office Action in CN application No. CN201910863810.2, dated May 16, 2022.
(Continued)

*Primary Examiner* — Daniel M. Robert
(74) *Attorney, Agent, or Firm* — Lee & Hayes, P.C.

(57) ABSTRACT

An automatic working system, a turning method thereof, and a self-moving device. When the self-moving device reaches a boundary, a control module controls a movement module to turn to leave the boundary. In addition, the control module may control, based on coverage values corresponding to each movement range when the self-moving device reaches the boundary, the movement module to turn to a movement range with a coverage value that meets a preset requirement.

18 Claims, 8 Drawing Sheets

(51) Int. Cl.
*G05D 1/224* (2024.01)
*G05D 1/648* (2024.01)

(58) Field of Classification Search
CPC .... G05D 1/0231; G05D 1/0257; G05D 1/027; G05D 1/0276; G05D 1/0278; A01D 34/008; A01D 2101/00
See application file for complete search history.

(56) References Cited

U.S. PATENT DOCUMENTS

| | | | |
|---|---|---|---|
| 2005/0000543 | A1 | 1/2005 | Taylor et al. |
| 2011/0295424 | A1 | 12/2011 | Johnson et al. |
| 2014/0058611 | A1 | 2/2014 | Borinato |
| 2016/0282870 | A1 | 9/2016 | Yamamura et al. |
| 2018/0354132 | A1 | 12/2018 | Noh et al. |
| 2019/0035099 | A1* | 1/2019 | Ebrahimi Afrouzi ... G06T 7/344 |
| 2019/0357430 | A1* | 11/2019 | Kraft ..................... A01D 34/64 |
| 2023/0147624 | A1* | 5/2023 | Gaud ................... G05D 1/0238 701/26 |
| 2024/0134394 | A1* | 4/2024 | Andriolo ............. G05D 1/2246 |

FOREIGN PATENT DOCUMENTS

| | | | |
|---|---|---|---|
| CN | 206491007 U | | 9/2017 |
| CN | 107291071 A | | 10/2017 |
| CN | 107831773 A | | 3/2018 |
| CN | 107943058 A | | 4/2018 |
| CN | 108594828 A | | 9/2018 |
| CN | 109947114 A | * | 6/2019 |
| CN | 106983460 B | | 8/2019 |
| DE | 102018113672 A1 | | 12/2018 |
| JP | 2014187951 A | * | 10/2014 |
| KR | 100791382 B1 | * | 6/2006 |
| KR | 10-2018-0134683 A | | 12/2018 |

OTHER PUBLICATIONS

First search in CN application No. CN201910863810.2, dated May 16, 2022.

* cited by examiner

User interface

AUTOMATIC WORK SYSTEM AND TURNING METHOD THEREFOR, AND SELF-MOVING DEVICE

CROSS-REFERENCE TO RELATED APPLICATION

This application is a National Stage Application of International Application No. PCT/CN2019/120977, filed on Nov. 26, 2019, which claims benefit of and priority to Chinese Patent Application No. 201910863810.2, filed on Sep. 12, 2019, all of which are hereby incorporated by reference in their entirety for all purposes as if fully set forth herein.

BACKGROUND

Technical Field

The present disclosure comprising embodiments of the invention, relates to an automatic working system, and further relates to a turning method of an automatic working system and a self-moving device.

Background

With the continuous development of computer technologies and artificial intelligence technologies, more and more people are choosing automatic working systems in daily lives. A self-moving device such as a robotic lawn mower or a robotic vacuum cleaner that automatically works in an automatic working system is usually set once before it can automatically work on a user's lawn or work indoors, so that the user is freed from tedious, boring, and time-consuming housework such as room cleaning and lawn maintenance.

Generally, a robotic product may work in a working region in a manner of moving along a random path. However, this manner may lead to uneven work in the working region. For example, for a lawn mower, when there is a narrow passage in a working region, because the narrow passage covers a small area, the self-moving device may fail to cross the narrow passage to reach other parts of the working region, or it may take a long time for the self-moving device to successfully cross the narrow passage. The self-moving device turns around several times in the narrow passage to cut grass repeatedly, resulting in uneven cutting. Alternatively, for a normal working region other than a narrow passage, work is repeated in some regions, and grass in some regions is left uncut. As a result, lawn maintenance becomes more complex, and energy is consumed more rapidly.

SUMMARY

To overcome deficiencies in the prior art, a problem that the embodiments of the present invention needs to solve is to provide a self-moving device and a turning method of the self-moving device, to perform even work in a working region.

A technical solution used by the present embodiments to solve the technical problem in the prior art is as follows: An automatic working system comprises a self-moving device that moves and works in a working region defined by a boundary, wherein the working region comprises at least one sub-region. The self-moving device comprises: a housing; a movement module, mounted on the housing and configured to drive the self-moving device to move and/or turn; and a control module, controlling the movement module to drive the self-moving device to move and/or turn. The automatic working system further comprises a navigation mechanism, configured to: record movement locations passed by the self-moving device when the self-moving device moves in the working region, and determine coverage values of the self-moving device in the sub-regions of the working region based on the movement locations.

When the self-moving device reaches the boundary, the control module controls the movement module to turn to leave the boundary, and based on coverage values corresponding to each movement range when the self-moving device reaches the boundary, the control module controls the movement module to turn to a movement range with a coverage value that meets a preset requirement.

In an embodiment of this application, the control module controls the movement module to turn in any one of movement directions in the movement range.

In an embodiment of this application, the navigation mechanism is further configured to determine an angular relationship between the movement direction of the self-moving device and the boundary, the control module controls, based on the angular relationship, the movement module to turn, and when the self-moving device reaches the boundary, if the angular relationship is an obtuse angle, the self-moving device is controlled to turn in a direction of the obtuse angle.

In an embodiment of this application, the movement range comprises a conical region with a current movement location of the self-moving device being the center and with a preset angle.

In an embodiment of this application, the control module determines the coverage value corresponding to the movement range based on a coverage value in a sub-region, where a distance between the sub-region and the self-moving device meets a preset distance.

In an embodiment of this application, the control module determines the coverage value corresponding to the movement range based on a coverage value in a sub-region adjacent to the self-moving device.

In an embodiment of this application, the coverage value corresponding to each movement range when the self-moving device reaches the boundary comprises a sum or an average value of the coverage values in the sub-regions of each movement range.

In an embodiment of this application, the at least one sub-region is defined by a sub-region boundary, and correspondingly, the movement range of the movement module is determined based on a sub-region boundary of a sub-region to which the movement module turns and a current movement location.

In an embodiment of this application, the movement range comprises a user-defined movement range or a preset movement range.

In an embodiment of this application, the coverage value in the sub-region is determined based on at least one of the following parameters: a movement time of the self-moving device in each sub-region, a quantity of passing times that the self-moving device passes each sub-region, and a movement path length of the self-moving device in each sub-region.

In an embodiment of this application, the preset requirement comprises that the coverage value is less than or equal to coverage values corresponding to other movement ranges.

In an embodiment of this application, the preset requirement comprises that the coverage value is less than or equal to a maximum value of coverage values corresponding to other movement ranges.

In an embodiment of this application, the preset requirement comprises that the coverage value is less than or equal to a preset coverage value.

In an embodiment of this application, the preset coverage value comprises a user-defined coverage value or a preset coverage value.

In an embodiment of this application, the navigation mechanism comprises at least one of the following: an ultrasonic sensor, a radar sensor, an optical sensor, an ultra wideband (UWB) sensor, an inertial navigation system, a satellite navigation mechanism, and a visual sensor.

In an embodiment of this application, the navigation mechanism is fixedly or detachably mounted on the self-moving device.

An embodiment of the present invention further provides a turning method of an automatic working system, where the self-moving device moves and works in a working region defined by a boundary. The method may comprise: monitoring a location relationship between the self-moving device and the boundary; and when it is detected that the self-moving device reaches the boundary, controlling, based on coverage values corresponding to each movement range, the self-moving device to turn to a movement range with a coverage value that meets a preset requirement.

In an embodiment of this application, before the controlling the self-moving device to turn to a movement range with a coverage value that meets a preset requirement, the method further comprises: dividing a map of the working region into a plurality of sub-regions; recording movement locations passed by a movement module when the movement module moves in the working region; and determining coverage values in each sub-regions of the working region based on the movement locations.

In an embodiment of this application, the controlling the self-moving device to turn to a movement range with a coverage value that meets a preset requirement may comprise: controlling the self-moving device to turn in any one of movement directions in the movement range.

In an embodiment of this application, the method further comprises: determining an angular relationship between the movement direction of the self-moving device and the boundary; and when the self-moving device reaches the boundary, if the angular relationship is an obtuse angle, controlling the self-moving device to turn in a direction of the obtuse angle.

In an embodiment of this application, the movement range may comprise a conical region with a current movement location of the self-moving device being the center and with a preset angle.

In an embodiment of this application, the coverage value corresponding to the movement range is determined based on a coverage value in a sub-region, where a distance between the sub-region and the self-moving device meets a preset distance.

In an embodiment of this application, the coverage value corresponding to the movement range is determined based on a coverage value in a sub-region adjacent to the self-moving device.

In an embodiment of this application, the controlling, based on coverage values corresponding to each movement range, the self-moving device to turn to a movement range with a coverage value that meets a preset requirement may comprise: controlling, based on a sum or an average value of the coverage values in the sub-regions of each movement range, a movement module to turn to a movement range with a coverage value that meets the preset requirement.

In an embodiment of this application, at least one sub-region may be defined by a sub-region boundary, and correspondingly, the movement range of the movement module during turning of the movement module is determined based on a sub-region boundary of a sub-region to which the movement module turns and a current movement location.

In an embodiment of this application, the movement range may comprise a user-defined movement range or a preset movement range.

In an embodiment of this application, the coverage value in the sub-region may be determined based on at least one of the following parameters: a movement time, a quantity of passing times, and a movement path length of the self-moving device in each sub-region.

In an embodiment of this application, the preset requirement may comprise that the coverage value is less than or equal to coverage values corresponding to other movement ranges.

In an embodiment of this application, the preset requirement may comprise that the coverage value is less than or equal to a maximum value of coverage values corresponding to other movement ranges.

In an embodiment of this application, the preset requirement may comprise that the coverage value is less than or equal to a preset coverage value.

In an embodiment of this application, preset coverage value may comprise a user-defined coverage value or a preset coverage value.

In an embodiment of this application, a navigation mechanism may comprise, but is not limited to, at least one of the following: an ultrasonic sensor, a radar sensor, an optical sensor, a UWB sensor, an inertial navigation system, a satellite navigation mechanism, and a visual sensor.

In an embodiment of this application, the navigation mechanism may be fixedly or detachably mounted on the self-moving device.

An embodiment of the present invention further provides a self-moving device that moves and works in a working region defined by a boundary, where the working region comprises at least one sub-region. The self-moving device comprises: a housing; a movement module, mounted on the housing and configured to drive the self-moving device to move and/or turn; a control module, controlling the movement module to drive the self-moving device to move and/or turn; and a navigation mechanism, configured to: record movement locations passed by the self-moving device when the self-moving device moves in the working region, and determine coverage values of the self-moving device in each sub-regions of the working region based on the movement locations.

When the self-moving device reaches the boundary, the control module controls the movement module to turn to leave the boundary, and based on coverage values corresponding to each movement range when the self-moving device reaches the boundary, the control module controls the movement module to turn to a movement range with a coverage value that meets a preset requirement.

In an embodiment of this application, the control module controls the movement module to turn in any one of movement directions in the movement range.

In an embodiment of this application, the navigation mechanism is further configured to determine an angular relationship between the movement direction of the self-moving device and the boundary, the control module controls, based on the angular relationship, the movement module to turn, and when the self-moving device reaches the boundary, if the angular relationship is an obtuse angle, the self-moving device is controlled to turn in a direction of the obtuse angle.

In an embodiment of this application, the movement range comprises a conical region with a current movement location of the self-moving device being the center and with a preset angle.

In an embodiment of this application, the control module determines the coverage value corresponding to the movement range based on a coverage value in a sub-region, where a distance between the sub-region and the self-moving device meets a preset distance.

In an embodiment of this application, the control module determines the coverage value corresponding to the movement range based on a coverage value in a sub-region adjacent to the self-moving device.

In an embodiment of this application, the coverage value corresponding to each movement range when the self-moving device reaches the boundary comprise a sum or an average value of the coverage values in the sub-regions of each movement range.

In an embodiment of this application, the at least one sub-region is defined by a sub-region boundary, and correspondingly, the movement range of the movement module is determined based on a sub-region boundary of a sub-region to which the movement module turns and a current movement location.

In an embodiment of this application, the movement range comprises a user-defined movement range or a preset movement range.

An embodiment of the present invention further provides a turning method of a self-moving device, where the self-moving device moves and works in a working region defined by a boundary. The method comprises: monitoring a location relationship between the self-moving device and the boundary; and when it is detected that the self-moving device reaches the boundary, controlling, based on coverage values corresponding to each movement range, the self-moving device to turn to a movement range with a coverage value that meets a preset requirement.

In an embodiment of this application, before the controlling the self-moving device to turn to a movement range with a coverage value that meets a preset requirement, the method further comprises: dividing a map of the working region into a plurality of sub-regions; recording movement locations passed by a movement module when the movement module moves in the working region; and determining coverage values in each sub-region of the working region based on the movement locations.

Compared with the prior art, beneficial effects of the embodiments of the present invention are as follows: The movement locations passed by the self-moving device when the self-moving device moves in the working region are recorded by the navigation mechanism, and the coverage values of the self-moving device in each sub-regions of the working region are determined based on the movement locations. When the self-moving device reaches the boundary, the control module controls the movement module to turn to leave the boundary, and the control module may control, based on the coverage values corresponding to each movement range when the self-moving device reaches the boundary, the movement module to turn to a movement range with a coverage value that meets the preset requirement. Coverage values in a movement range during turning of the self-moving device are determined, so that path planning of the self-moving device during movement is implemented, thereby facilitating even work of the self-moving device in a working region and improving the working efficiency of the self-moving device.

BRIEF DESCRIPTION OF THE DRAWINGS

The foregoing objectives, technical solutions, and beneficial effects of the embodiments of the present invention may be achieved through the following accompanying drawings.

DETAILED DESCRIPTION

The following clearly and completely describes the technical solutions in the embodiments of the present invention with reference to the accompanying drawings in the embodiments of the present invention. Obviously, the described embodiments are only some embodiments instead of all the embodiments of the present invention. All other embodiments obtained by a person of ordinary skill in the art based on the embodiments of the present invention without creative effects shall fall within the protection scope of the present invention.

In this specification, the terms used in the specification of the present invention are merely intended to describe the objectives of the specific embodiments, but are not intended to limit the present invention. In addition, the term "and/or" used in this specification comprises any or all combinations of one or more related listed items.

Figure 1:
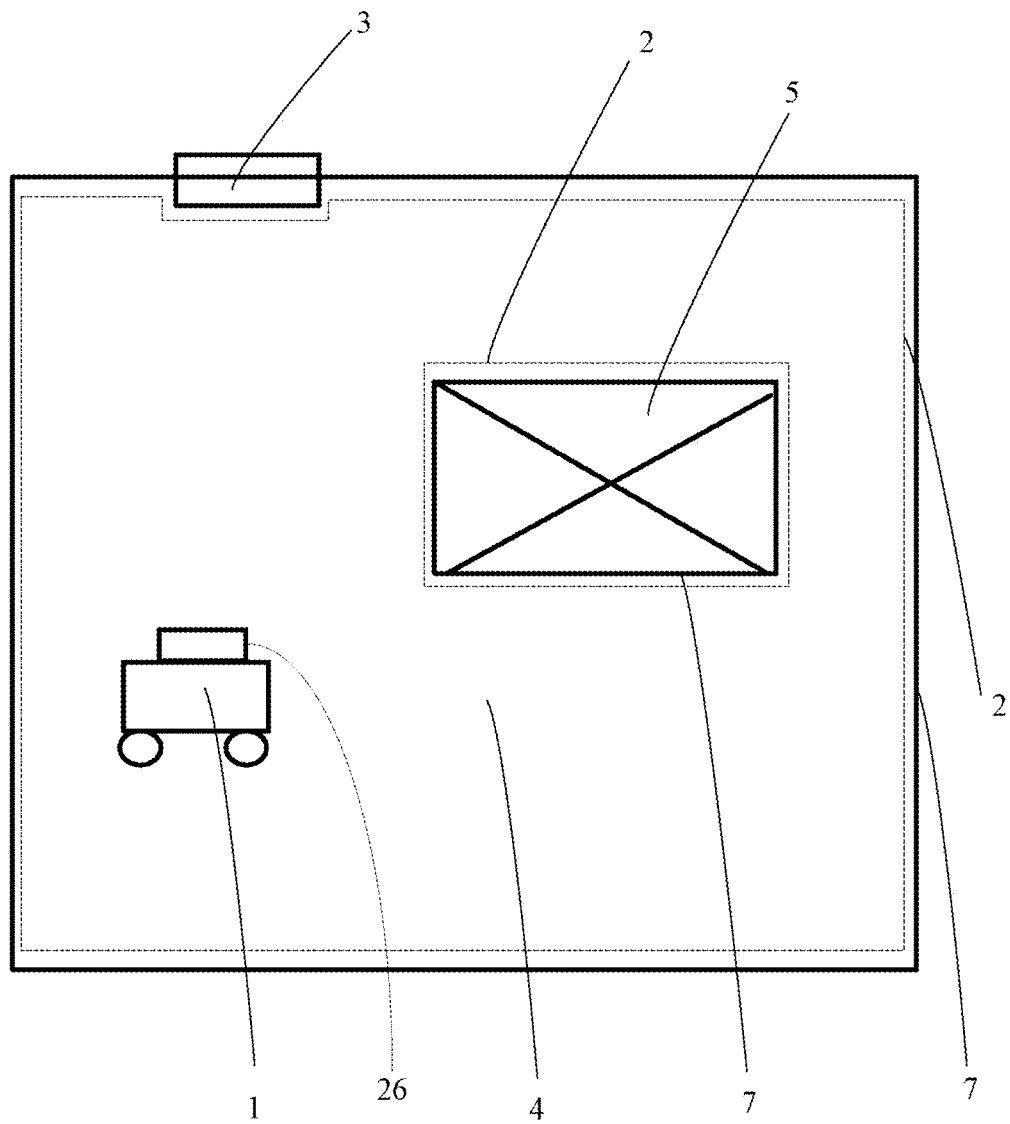
FIG. 1 is a schematic diagram of an automatic working system according to an embodiment of the present invention.

FIG. 1 shows an automatic working system in this specific implementation. The automatic working system may comprise a self-moving device 1, a boundary 7, and a base station 3. The self-moving device 1 moves and works in a working region 4 defined by the boundary 7, and the base station 3 may be used to charge the self-moving device when the self-moving device returns because the battery runs low. The boundary 7 may be a periphery of the entire working region, and may be referred to as an outer boundary. The boundary is usually connected end to end to close the working region 4, and may be an electrical boundary or a physical boundary. The physical boundary may be merely a natural physical boundary formed by a border between the working region 4 and a non-working region or the like, for example, a natural boundary between grass and non-grass, or a boundary formed by a wall, a fence, a rail or the like. The electrical boundary may be a virtual boundary signal such as an electromagnetic signal, an acoustic signal or an optical signal generated by arranging a conducting wire around the working region 4 and using a boundary signal generation device connected to the conducting wire. As shown in FIG. 1, a region 5 that is not suitable for the self-moving device 1 to work exists in the working region, and a boundary formed by the region 5 such as a flowerbed, a pool or an obstacle is referred to as an inner boundary. A part outside the inner boundary is the working region. In this embodiment of this application, the automatic working system further comprises a navigation mechanism 26 for positioning. The navigation mechanism 26 may be an independent device or may be integrate with the self-moving device 1. The navigation mechanism 26 may be detachably or fixedly mounted on the self-moving device 1.

The self-moving device 1 may be an unmanned device such as an autonomous lawn mower, a robotic vacuum cleaner or an autonomous snowplow, which automatically move on the surface of a working region and perform work such as mowing, vacuuming or snow plowing. Certainly, the self-moving device is not limited to the autonomous lawn mower, the robotic vacuum cleaner or the autonomous snowplow, and may be another unmanned device. This is not limited in this application.

In the following specific embodiment, the automatic working system is described in detail as an autonomous lawn mower system, in other words, the self-moving device 1 is an autonomous lawn mower 20. As shown in FIG. 1, the boundary 7 defines a working region of the autonomous lawn mower 20, and the boundary 7 may be a physical boundary or an electrical boundary.

Figure 2:
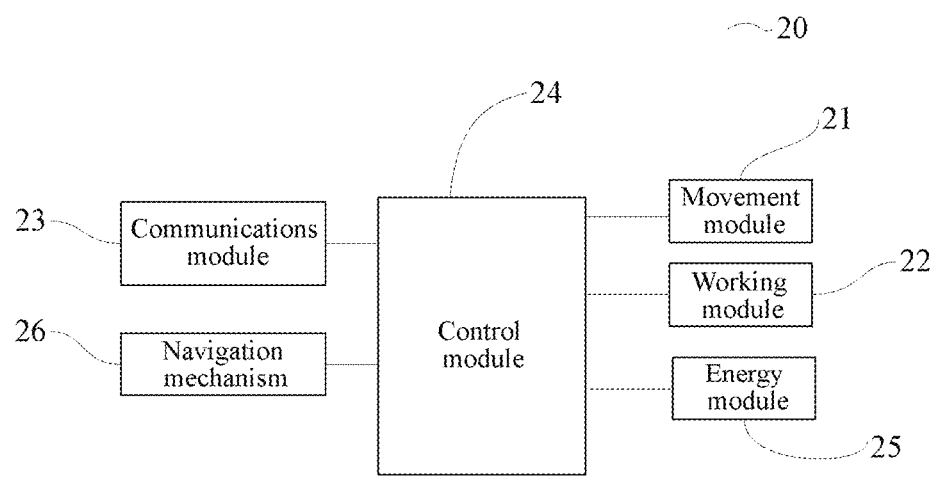
FIG. 2 is a schematic diagram of functional modules of a lawn mower according to an embodiment of the present invention.
Figure 3:
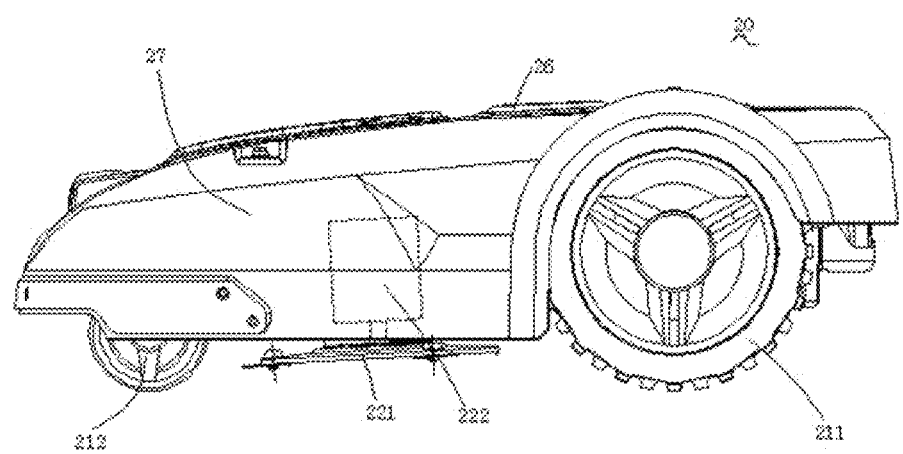
FIG. 3 is a schematic structural diagram of a lawn mower according to an embodiment of the present invention.

As shown in FIG. 2 and FIG. 3, the autonomous lawn mower 20 comprises a housing 27, and may further comprise a movement module 21, a working module 22, a control module 24, and an energy module 25. The control module 24 is connected to and controls the movement module 21 and the working module 22 to implement automatic movement and working of the autonomous lawn mower 20.

Specifically, the movement module 21 may comprise a wheel set and a movement motor driving the wheel set. Generally, the wheel set comprises a driving wheel 211 driven by the movement motor and an auxiliary wheel 212 that helps to support the housing. It may be understood that, the movement module 21 may be alternatively a continuous track structure. In an embodiment, the movement motor may be directly connected to driving wheels, and a right driving wheel and a left driving wheel are separately connected to a movement motor to implement a differential output to control turning. In another embodiment, the movement motor can also be provided with a transmission device, in other words, a same motor drives the right driving wheel and the left driving wheel through different transmission devices, so as to realize differential output control turning.

The working module 22 is a grass-cutting module, and comprises a cutting blade 221 that may be driven by a cutting motor 222 to work. The center of the working module 22 is located on a central axis X of the autonomous lawn mower 20, and is disposed below the housing and located between the auxiliary wheel and the driving wheel or closer to the left side or right side of the housing. The energy module 25 is fixedly or detachably mounted on the housing and may be a battery pack. When working, the battery pack releases electric energy to keep the autonomous lawn mower 20 working and moving. When not working, the battery may be connected to an external power supply for charging. The autonomous lawn mower 20 may automatically search for the base station 3 for charging when detecting that the battery runs low. The control module 24 may be a controller, and may control, according to a preset program or a received instruction, the autonomous lawn mower 20 to move, turn and automatically work. The autonomous lawn mower 20 may further comprise a communications module 23 for communication between the autonomous lawn mower 20 and a client or server.

As shown in FIG. 1, the autonomous lawn mower system may further comprise a navigation mechanism 26, which may comprise, but is not limited to, at least one of the following: an ultrasonic sensor, a radar sensor, an optical sensor (for example, a laser sensor and an infrared sensor), a UWB sensor, a satellite navigation mechanism (a navigation mechanism such as a Real Time Kinematic (RTK), a Global Positioning System (GPS) and a Beidou navigation satellite system), a visual sensor, and the like. The navigation mechanism 26 may further comprise an inertial navigation system. The inertial navigation system may comprise a gyroscope, an accelerometer, and the like. The inertial navigation system can cooperate with the satellite navigation mechanism and perform assisted navigation when a satellite signal is poor. Preferably, the navigation mechanism 26 may be mounted at a location that helps to receive an external positioning signal, for example, may be mounted above the housing of the autonomous lawn mower 20, or the navigation mechanism 26 may be mounted in the front of the housing, to ensure that the autonomous lawn mower 20 can timely turn to the interior of the working region, thereby preventing it from crossing the working region. Certainly, the navigation mechanism 26 may be mounted at another location of the housing. This is not limited in this application.

In an embodiment of this application, the navigation mechanism 26 may be configured to record movement locations passed by the lawn mower 20 when the lawn mower 20 moves in the working region, and may be detachably or fixedly mounted on the lawn mower 20, or may be a part of the lawn mower 20. When removed from the autonomous lawn mower 20, the navigation mechanism 26 may work independently, and record location coordinates passed by the navigation mechanism 26 during movement. When mounted on the housing 27 of the autonomous lawn mower 20, the navigation mechanism 26 may be electrically connected to the control module of the autonomous lawn mower 20, and output a current location coordinate of the autonomous lawn mower 20. In this embodiment, a user may hold the navigation mechanism 26 and walk or the autonomous lawn mower 20 mounted with the navigation mechanism may be controlled to move along the boundary (comprising the inner boundary and the outer boundary) of the working region to record a boundary location coordinate of the working region. Alternatively, the boundary of the working region may be drawn on an electrical map to generate a working region map. It should be noted that, a map boundary 2 generated in the foregoing three manners may have an offset towards the working region by a distance compared with the boundary 7 in FIG. 1, so that the autonomous lawn mower 20, when working based on the map boundary 2, does not cross an actual boundary of the working region, thereby ensuring safety. Preferably, the distance may be 30 cm. The autonomous lawn mower system with a navigation function is used to generate the working region map, and grass-cutting work is performed based on the map, so that the user does not need to set a boundary line, thereby reducing the workload. It should be noted that, any boundary that a lawn mower encounters during working described below in this application may be the foregoing map boundary 2.

Figure 4:
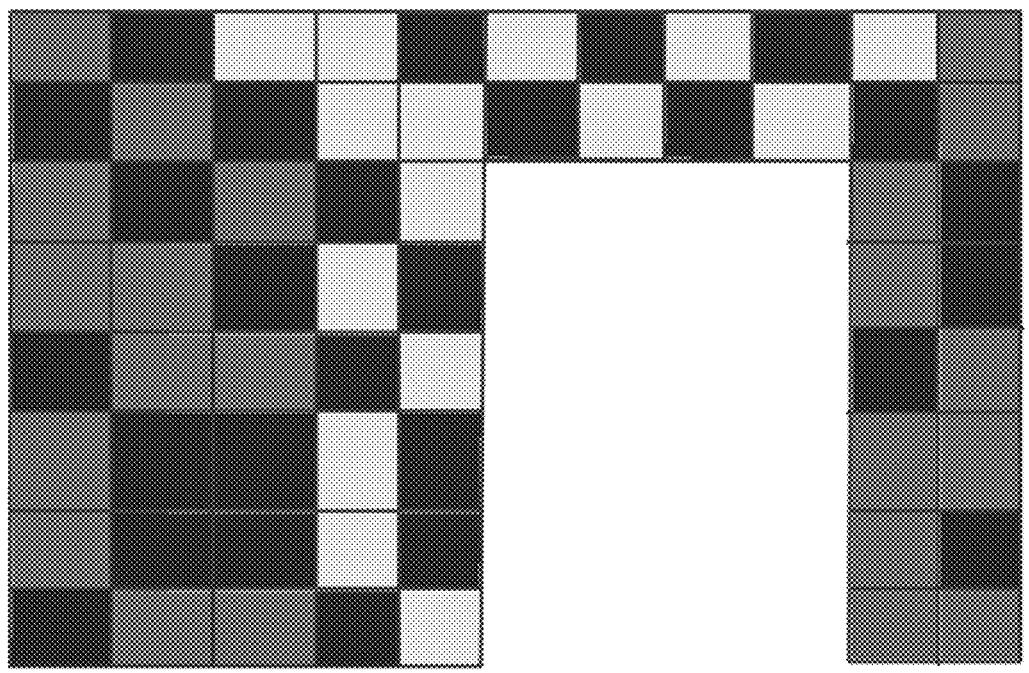
FIG. 4 is a schematic diagram of working region division according to an embodiment of the present invention.

In an embodiment of this application, the working region map may be divided into a plurality of sub-regions according to a user-defined division requirement, a preset division requirement in the lawn mower system or the precision of the lawn mower system, for example, positioning precision, and cutting requirements of each sub-regions obtained through division are approximately the same. FIG. 4 is a schematic diagram of working region division displayed on a client. The working region is divided into a plurality of squares with an equal area as shown in FIG. 4 according to positioning precision of the navigation mechanism. In this schematic diagram, the shade of a square represents a coverage value in the square in the corresponding working region, where a lighter shade represents a smaller coverage value, and a darker shade represents a larger coverage value. It should be noted that, there may be deviations in data during actual application. Therefore, the squares with an equal area may be squares with approximately equal areas instead of an identical area. FIG. 4 merely provides exemplary description, and the working region may be divided according to another standard. This is not limited in this application. Specifically, the foregoing map division may be performed in the navigation mechanism 26, a server, or the autonomous lawn mower 20. This is not limited in this application.

Further, when the region 5 such as a flowerbed, a pool or an obstacle that is not suitable for the autonomous lawn mower 20 working exists, during the generation of a map, the map may be generated along both the outer boundary and the inner boundary, so that during the subsequent division of the working region, division may be performed on a map without the region 5.

As the autonomous lawn mower 20 moves, the navigation mechanism 26 may record movement locations passed by the navigation mechanism 26 in the working region, and determine coverage values of the autonomous lawn mower 20 in each sub-regions according to the recorded movement locations. Specifically, the coverage value in each sub-region may be determined based on, but is not limited to, at least one of the following movement location parameters: a movement time, a quantity of passing times, and a movement path length of the lawn mower moves in each sub-region. In an embodiment, the coverage value may be a corresponding parameter determined based on the foregoing movement location parameter of the autonomous lawn mower 20 or a proportion of the corresponding parameter, for example, a proportion value of the movement time in each sub-region in a total movement time. For example, the working region is divided into 5 sub-regions, where a movement time in a sub-region 1 is 5 s, a movement time in a sub-region 2 is 5 s, a movement time in a sub-region 3 is 10 s, a movement time in a sub-region 4 is 15 s, and a movement time in a sub-region 5 is 20 s. The coverage values may be determined according to a movement time of the lawn mower in each sub-regions. A coverage value in the sub-region 1 is: 5 s/(5 s+5 s+10 s+15 s+20 s)=9.1%, and a coverage value in the sub-region 2, a coverage value in the sub-region 3, a coverage value in the sub-region 4, and a coverage value in the sub-region 5 are respectively 9.1%, 18.2%, 27.2%, and 36.4%. Certainly, the corresponding parameter or the corresponding proportion may be determined by using another movement location parameter such as a movement path. This is not limited in this application.

When it is detected that the autonomous lawn mower 20 reaches the boundary 2, the control module may control the movement module to turn to leave the boundary 2, and may control, based on the coverage values corresponding to each movement ranges when the autonomous lawn mower 20 reaches the boundary 2, the movement module to turn to a movement range with a coverage value that meets a preset requirement. In this embodiment, when the lawn mower reaches the boundary, the lawn mower does not turn randomly, but instead, the movement range to which the lawn mower turns when the lawn mower reaches the boundary is defined by using the coverage value. In other words, a movement path of the autonomous lawn mower 20 is planned by controlling the coverage value in the movement range to which the lawn mower turns, thereby implementing even work of the lawn mower in the working region. Further, when the autonomous lawn mower 20 is in a narrow region, for example, when the autonomous lawn mower 20 works in a narrow passage, in the manner of defining the coverage value provided in this application, the autonomous lawn mower 20 can evenly cut grass in the narrow region and leave the narrow region rapidly.

Figure 5:
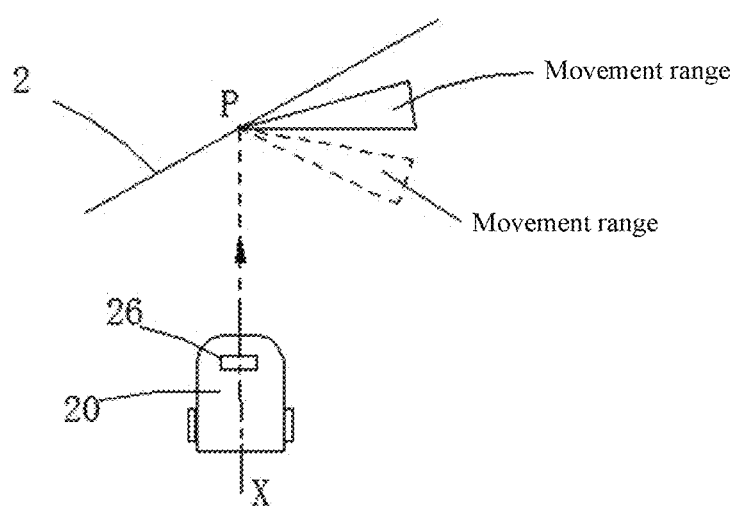
FIG. 5 and FIG. 6 are schematic diagrams of a turning method of a lawn mower according to an embodiment of the present invention.

FIG. 5 is a schematic diagram of a turning method of a lawn mower according to an embodiment. In this embodiment, the movement range may be a cone or a sector. Specifically, the movement range may be a cone with a current movement location of the lawn mower being the center and with a preset angle. In this case, when the lawn mower reaches the boundary and turns to leave the boundary, the control module may control, based on coverage values corresponding to each cone when the lawn mower reaches the boundary, the movement module to turn to a cone with a coverage value that meets the preset requirement.

Specifically, when the lawn mower reaches a movement location corresponding to the boundary, all possible turning ranges in the working region may be scanned sequentially with the current movement location being the center and in the form of a cone from one side of the boundary to the other side (a dashed cone and a solid cone are used as an example in FIG. 5) to obtain the coverage value corresponding to each cone during turning. The scanning described in this embodiment of this application may be implemented by a related program in the lawn mower system, rather than scanning with physical sensors. A scanning direction may be clockwise or counterclockwise, as long as all corresponding possible turning movement ranges are scanned when the lawn mower reaches the boundary. A specific scanning manner and a scanning starting location are not limited in this application. The coverage value corresponding to the cone may be coverage values in all sub-regions of the cone, where all the sub-regions of the cone may be complete sub-regions comprised in the cone, and sub-regions that are not completely comprised in the cone and passed by the cone. Correspondingly, the coverage values in all the sub-regions of the cone may be a sum, a product or an average value of the coverage values in the sub-regions, or may be a maximum coverage value, a minimum coverage value, a median or the like of the coverage values in the sub-regions. After the coverage values corresponding to each cone are obtained, a coverage value that meets the preset requirement may be selected from the coverage values, and the lawn mower is controlled to turn to a conical region corresponding to the coverage value. The radius of the cone and the preset angle may be defined by a user or preset in the system. This is not limited in this application. In this embodiment of this application, the cone is merely an example of the movement range for description. In addition to the cone, the movement range may be in another form such as a sector or a quadrilateral. This is not limited in this application.

Figure 6:
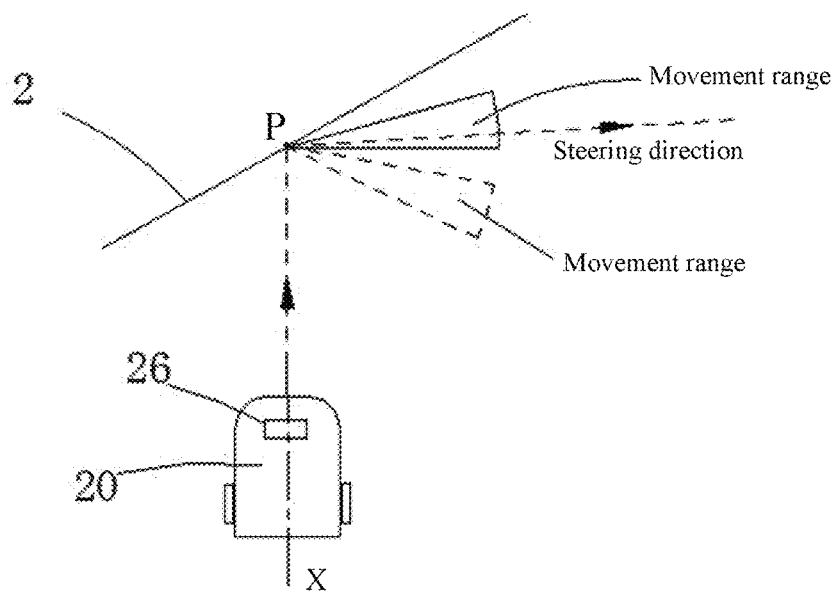

When the conical region that meets the preset requirement is determined, the lawn mower may be controlled to turn in any one of movement directions in the conical region, where a movement direction of the autonomous lawn mower 20 is a direction along a lengthwise central axis of the conical region. As shown in FIG. 6, when the solid cone is a movement range that meets the requirement, the lawn mower may be controlled to select any one of the movement directions in the conical region to turn, and may turn in a turning direction shown by the dashed line on FIG. 6.

In this embodiment of this application, when the lawn mower reaches the boundary, two rear driving wheels may be controlled to separately turn at different rotational speeds or in different directions, or one of the rear driving wheels is controlled to stop and the other is controlled to turn the lawn mower.

Figure 7:
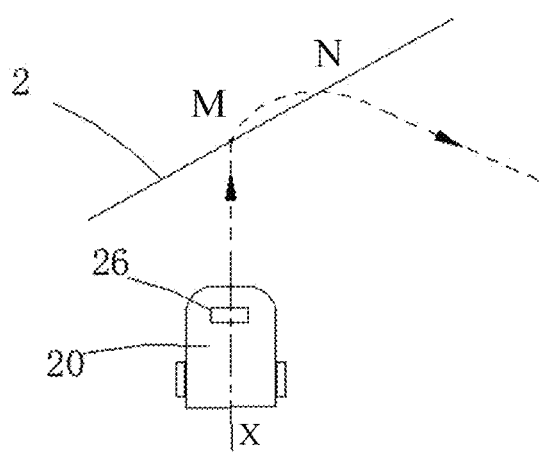
FIG. 7 is a schematic diagram of a turning method of a lawn mower according to an embodiment of the present invention.

It should be noted that, the boundary 2 in the working region may be generally curved or straight. In this application, for convenience of illustration, the boundary is shown to be straight for description. However, this embodiment of this application may further be applied to a scenario that the boundary is not straight. Meanwhile, because of inertia, the movement path of the lawn mower during turning may cross the boundary. As shown in FIG. 7, an intersection between the movement direction before the lawn mower turns and the boundary and an intersection between the movement direction after the lawn mower turns and the boundary may not overlap. In other words, there are two intersections (a point M and a point N). However, because a moving speed of the lawn mower is relatively slow and a turning radius of the lawn mower during turning is relatively small, it may be considered that there is only one intersection (an intersection P in FIG. 5 and FIG. 6) between the movement direction of the lawn mower during turning and the boundary, and control of the movement direction after the lawn mower turns is not affected.

Figure 8:
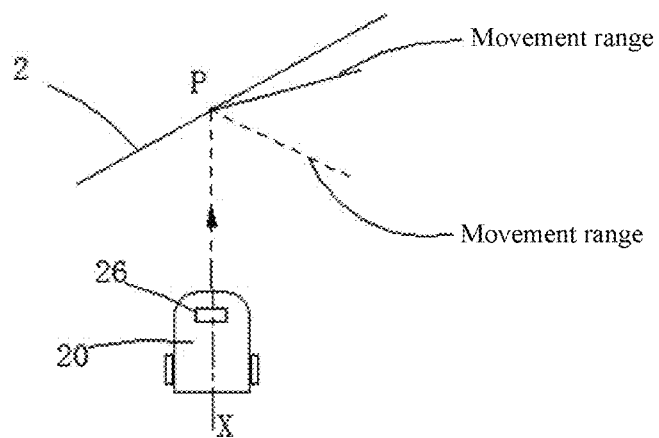
FIG. 8 and FIG. 9 are schematic diagrams of a turning method of a lawn mower according to another embodiment of the present invention.
Figure 9:
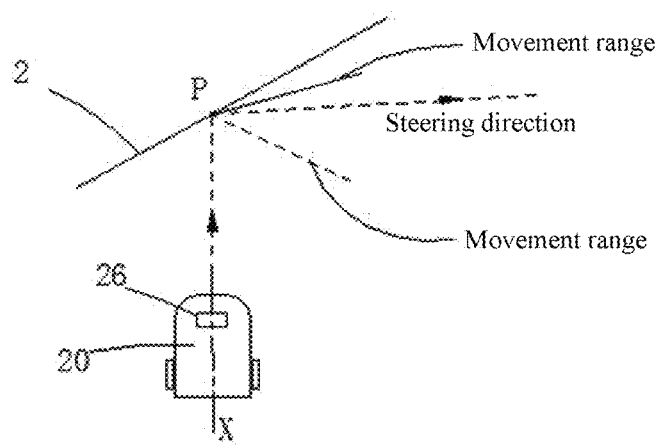

In another embodiment of this application, FIG. 8 and FIG. 9 are schematic diagrams of a turning method of a lawn mower according to another embodiment. The movement range may be a line segment with a current movement location being the center and with a preset length. When reaching the current movement location corresponding to the boundary, the lawn mower may scan the working region corresponding to the lawn mower during turning in the form of a line segment (a dashed cone and a solid cone are used as an example in FIG. 8). In other words, the lawn mower may scan the working region in the form of a line segment from one side of the boundary to the other to obtain coverage values corresponding to line segment during turning. After the coverage values corresponding to the line segments are obtained, a coverage value that meets the preset requirement may be selected from the coverage values, and the lawn mower is controlled to turn in a line segment direction (which may also be referred to as the movement direction) corresponding to the coverage value. The coverage value corresponding to the line segment may be coverage values in all sub-regions passed by the line segment in a movement direction, and may be a sum, a product or an average value of the coverage values in the sub-regions, or may be a maximum coverage value, a minimum coverage value, a median or the like of the coverage values in the sub-regions. When a sub-region is passed by a line segment, there may be at least one intersection between the line segment and the sub-region. The preset length of the line segment may be defined by a user or preset in the system. This is not limited in this application.

After the line segment that meets the preset requirement is determined, the lawn mower may be controlled to turn in a direction corresponding to the line segment. A movement direction of the autonomous lawn mower 20 is a direction along a lengthwise central axis of the line segment. As shown in FIG. 9, the lawn mower may be controlled to select a line segment that meets the preset requirement to turn, as shown by the dashed line representing a turning direction in FIG. 9.

Figure 10:
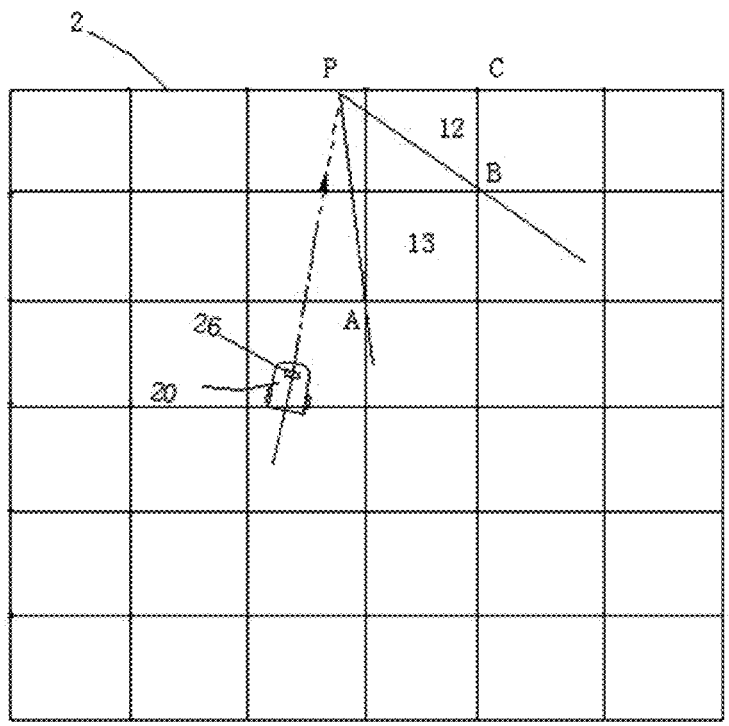
FIG. 10 and FIG. 11 are schematic diagrams of a turning method of a lawn mower according to another embodiment of the present invention.
Figure 11:
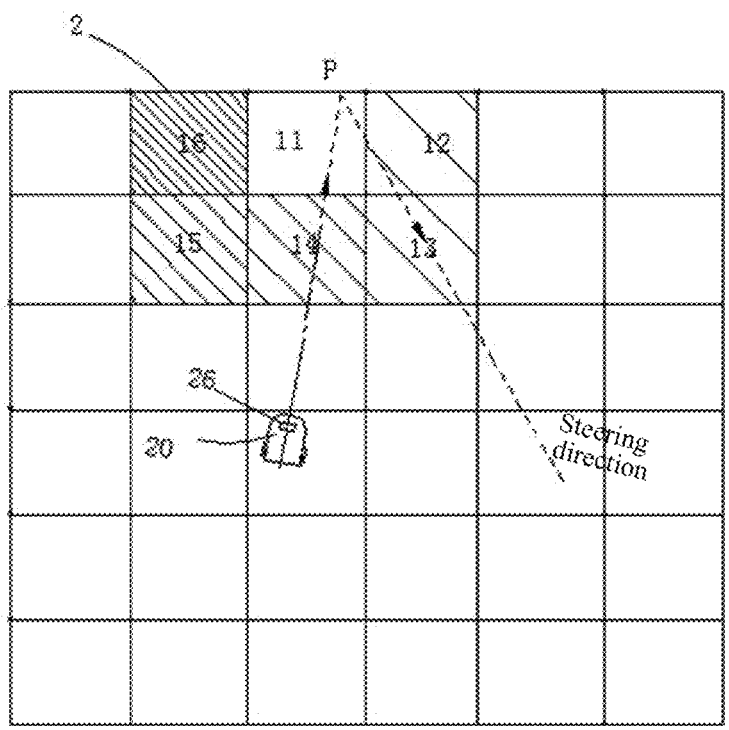

FIG. 10 and FIG. 11 are schematic diagrams of a turning method of a lawn mower according to another embodiment of the application. As shown in FIG. 10, after the working region map is obtained, the working region map is divided into a plurality of squares (for example, a square 13), and the square may further be referred to as a sub-region. At least one sub-region obtained after the working region map is divided may be defined by a sub-region boundary. Correspondingly, in an embodiment of this application, the movement range of the lawn mower may be determined by the current movement location of the autonomous lawn mower 20 and the sub-region boundary, so that an angle at which the lawn mower turns may be located between connecting lines between the current movement location and two end points in a sub-region boundary to which the lawn mower turns, thereby ensuring that the lawn mower can move to a corresponding sub-region after turning. As shown in FIG. 10, the sub-region to which the lawn mower turns is the square 13, and two end points of a diagonal of the square 13 are a point A and a point B. In this case, the movement direction of the lawn mower during turning may be located between PA and PB. In another embodiment of this application, when a coverage value in an adjacent sub-region is close or the same, the sub-region and the adjacent sub-region may be combined into a whole. The movement range of the lawn mower is determined according to the current movement location of the lawn mower and a boundary of the whole. An average value or a maximum value or a median of coverage values is calculated for the whole. The obtained value is used as the coverage value of the whole. The control module may select any one of directions in the movement range as the movement direction during turning, and the movement module is controlled to turn in the movement direction. As shown in FIG. 10, if a square 12 and the square 13 are two adjacent squares with close coverage values, the square 12 and the square 13 may be used as a whole. A coverage value of the whole may be determined. When the square 12 and the square 13 are sub-regions to which the lawn mower chooses to turn, the lawn mower may select a movement direction between PA and PC to turn.

In an embodiment of this application, the control module may determine the coverage value corresponding to the movement range based on coverage values in sub-regions adjacent to the lawn mower, and control the lawn mower to turn to a movement range with a coverage value that meets the preset requirement. In an embodiment, the controlling the lawn mower to turn to a movement range with a coverage value that meets the preset requirement may be controlling the lawn mower to turn to a sub-region with a coverage value that meets the preset requirement. In other words, the movement range of the lawn mower may be determined by the current movement location of the lawn mower and a sub-region boundary adjacent to the movement location when the lawn mower reaches the boundary. When the lawn mower reaches the current movement location to turn to leave the boundary, corresponding sub-regions during turning may be scanned in the form of a sub-region to obtain coverage values in the sub-regions adjacent to the lawn mower. Alternatively, the coverage values in the sub-regions adjacent to the lawn mower may be directly read from the coverage values in the sub-regions, and a coverage value that meets the preset requirement may be selected form the coverage values in the sub-regions adjacent to the lawn mower. Further, the lawn mower is controlled to turn to a sub-region corresponding to the coverage value. In another embodiment of this application, when some sub-regions with close coverage values or a same coverage value exist in the sub-regions adjacent to the lawn mower, the sub-regions may be used as a whole, and a coverage value of the whole is compared with coverage values in other sub-regions adjacent to the lawn mower, to select a coverage value that meets the preset requirement. The sub-regions adjacent to the lawn mower may comprise a sub-region in which the lawn mower is located when the lawn mower reaches the boundary, or may comprise a sub-region adjacent to the sub-region in which the lawn mower is located. For example, FIG. 11 is a schematic diagram of a turning method of a lawn mower according to another embodiment of the present invention. In the lawn mower working system, the sub-regions adjacent to the lawn mower may comprise squares 11, 16, and 12, or may be squares 12, 13, 14, 15, and 16. In other words, all these squares may be the sub-regions adjacent to the lawn mower. In the foregoing second case, there is an intersection P between the movement direction of the lawn mower during turning and the boundary. If the square 13 is a movement range that meets the preset requirement, the lawn mower may be controlled to turn to the square 13. As shown in FIG. 11, a movement direction may be randomly selected from a plurality of movement directions that pass the point P and the square 13 to turn.

Further, when coverage values in the sub-regions adjacent to the lawn mower are approximately the same, the movement range may be determined according to sub-regions adjacent to the adjacent sub-regions. In other words, when the coverage values in the sub-regions adjacent to the lawn mower are the same, coverage values in the sub-regions adjacent to the adjacent sub-regions may be compared, and a sub-region with a coverage value that meets the preset requirement may be selected to enable the movement module to turn to the sub-region. Therefore, in a scenario in which the coverage values in the sub-regions adjacent to the lawn mower are approximately the same, the coverage values in the sub-regions adjacent to the adjacent sub-regions may be compared to control the movement module to turn. If in this case, the coverage values are still approximately the same, the coverage values in the sub-regions adjacent to the sub-region may further be compared. This is not limited in this application.

In an embodiment of this application, the control module may determine the coverage value corresponding to the movement range based on a coverage value in a sub-region, where a distance between the sub-region and the lawn mower meets a preset distance, and control the lawn mower to turn to a movement range with a coverage value that meets the preset requirement. In this embodiment, the preset distance may comprise a preset distance range. In an embodiment, the controlling the lawn mower to turn to a movement range with a coverage value that meets the preset requirement may be controlling the lawn mower to turn to the sub-region with a coverage value that meets the preset distance. In other words, the movement range of the lawn mower may be determined by the current movement location of the lawn mower and a sub-region boundary that meets the preset distance from the current movement location. Similarly, an adjacent sub-region with approximately the same coverage value may be combined for comparison. In another embodiment of this application, the movement range may comprise a sector or cone with a preset angle. Specifically, when a cone shown in FIG. 5 is used for scanning, the lawn mower may be controlled to turn to a movement range with a coverage value that meets the preset requirement based on a conical or sector-shaped region (In other words, a sector comprising an outer arc and an inner arc) in the cone, where a distance between the region and the lawn mower meets the preset distance. A determination method of a coverage value of a cone or a coverage value of a sector is similar to the foregoing determination method. Details are not described herein again in this application. Certainly, in addition to the cone, the movement range may have another shape such as a quadrilateral, where a distance between the shape and the lawn mower meets the preset distance. As shown in FIG. 9, during the scanning of the working region in the form of a line segment, the lawn mower may be controlled, based on a coverage value in a sub-region in the working region that is provided with a same distance from the point P, to turn to a movement range with a coverage value that meets the preset requirement. The preset distance may be a user-defined distance or a distance preset in the system. This is not limited in this application.

In another embodiment of this application, the movement range may be a user-defined distance or may be a distance preset by the lawn mower system. In other words, the movement range of the lawn mower may be defined by the user, or the movement range of the lawn mower may be preset in the system, to control the lawn mower to turn.

Further, for the region 5 such as a flowerbed, a pool or an obstacle that is not suitable for mowing in the working region, coverage values in each sub-regions on a map obtained after removal of the region 5 and division may be determined. In this case, during the turning of the lawn mower, it can be based on the coverage values in each sub-regions obtained after removing region 5, and based on the coverage values corresponding to each movement range when the lawn mower reaches the boundary, the control module may control the movement module to turn to a movement range with a coverage value that meets the preset requirement. A specific manner of determining a movement range, a specific turning rule, and the like are similar to those in the scenario without the region 5. Details are not described again in this application.

In an embodiment of this application, after selecting a sub-region to which the autonomous lawn mower 20 turns and turning in a movement direction corresponding to the sub-region to work, if an abnormality (for example: stuck, dropped, crashed, lifted, etc.) that is not marked on the map is detected when steering in the movement direction, the lawn mower may handle the abnormality first. Specifically, the lawn mower may bypass the abnormality and continues to work in the selected movement direction according to the original map after bypassing the abnormality. Alternatively, after bypassing the abnormality, the lawn mower may repair the map according to a new path, and perform division and determine coverage values in sub-regions again based on the repaired map, so that the lawn mower is controlled, based the coverage values in the sub-regions that are determined again, to turn. If the user is next to the lawn mower, the lawn mower may raise an alarm when detecting an abnormality, so that the user may handle the abnormality in time and control the lawn mower to work based on the original map. Alternatively, the user may mark the abnormality on the map and control the lawn mower to perform division again based on the map marked the abnormality, so as to determine coverage values in sub-regions again, thereby controlling, based on the new map, the movement module to turn to a movement range with a coverage value that meets the preset requirement. Alternatively, before reaching the boundary, the lawn mower first detect whether there is an abnormality in each movement range. If there is no abnormality, the lawn mower is controlled based on the coverage values to turn. If there is an abnormality, the lawn mower marks the abnormality, forms a new map, and determines coverage values in each sub-region again, to control the movement module to turn. When detecting an abnormality such as an obstacle or a crash, one of the foregoing manners may be selected to control the lawn mower to turn. Details are not described again in this application.

In the foregoing embodiment, as the control module controls the movement module to turn, the control module may control the two driving wheels to implement turning of the autonomous lawn mower 20 at different speeds or in different turning directions, so that the lawn mower may turn to a side of a driving wheel with a slower rotational speed or to a side of a driving wheel with a backward rotational direction.

When moving and working in the working region, the autonomous lawn mower 20 normally moves along a straight line until the autonomous lawn mower 20 detects the boundary 2. When the autonomous lawn mower 20 reaches the boundary, the autonomous lawn mower 20 changes an original movement direction to leave the boundary 2 and returns to the working region to keep moving along a straight line until the autonomous lawn mower 20 reaches the boundary 2 again. By turning around several times in the boundary 2, the autonomous lawn mower 20 covers the entire working region to work. However, during working, when reaching the boundary 2 and turning, the lawn mower has a deficiency of turning to a working region in which the lawn mower has worked several times, and as a result, work is repeated in some regions while work is never done in some regions. In other words, the lawn mower works unevenly in the working region. In addition, when there is a narrow passage in the working region, the lawn mower may fail to cross the narrow passage to reach other parts of the working region, or it may take a long time for the lawn mower to successfully cross the narrow passage, resulting in a deficiency that grass in some regions is left uncut or is unevenly cut in the working region.

Therefore, a path planning manner is provided in this embodiment. In the path planning manner, after the map is divided into at least one sub-region, the autonomous lawn mower 20 may record movement locations passed by the autonomous lawn mower 20 in the working region during movement, and determine coverage values of the autonomous lawn mower 20 in each sub-region based on the movement locations. When the autonomous lawn mower 20 reaches the boundary, the control module may control, based on the coverage values corresponding to each movement range when the autonomous lawn mower 20 reaches the boundary, the autonomous lawn mower 20 to turn to a movement range with a coverage value that meets the preset requirement, so as to leave the boundary. Coverage values in movement ranges during turning of the autonomous lawn mower 20 are determined, so that path planning of the lawn mower during movement is implemented, thereby facilitating even work of the autonomous lawn mower 20 in a working region.

In an embodiment of this application, when the lawn mower reaches the boundary, the control module may control the movement module to turn to leave the boundary, and may control, based on the coverage values corresponding to each movement range when the lawn mower reaches the boundary, the movement module to turn to a movement range with a coverage value that is less than or equal to coverage values corresponding to other movement ranges. That is, after obtaining the coverage values in each movement range, the control module may select a movement range with a minimum coverage value, so that the control module controls the movement module to turn to the movement range with the minimum coverage value. After the movement range to which the lawn mower turns is determined, the control module may control the movement module to turn in any one of the movement directions in the movement range. The movement module is controlled to turn to the movement range with the minimum coverage value. That is, the lawn mower is more likely to move to a region with a small coverage value during movement, so that a movement coverage rate of the lawn mower can be increased, thereby implementing even work of the lawn mower in the working region.

In an embodiment of this application, when the lawn mower reaches the boundary, the control module may control the movement module to turn to leave the boundary, and may select, based on the coverage values corresponding to each movement range when the lawn mower reaches the boundary, a movement range with a coverage value is less than or equal to a maximum value of the coverage values in other movement ranges, and control the movement module to turn to a movement range corresponding to the coverage value. That is, after obtaining the coverage value in each movement range, the control module may select at least one movement range with a non-maximum coverage value, and randomly select a movement range from the movement ranges that meet the requirement. After the movement range to which the lawn mower turns is determined, the control module may control the movement module to turn in any one of the movement directions in the movement range.

In an embodiment of this application, when the lawn mower reaches the boundary, the control module may control the movement module to turn to leave the boundary, and may control, based on the coverage values corresponding to each movement range when the lawn mower reaches the boundary, the movement module to turn to a movement range with a coverage value that is less than or equal to a preset coverage value. The preset coverage value may comprise a user-defined coverage value and/or a preset coverage value, that is, may be a user-defined coverage value and/or a coverage value that each preset sub-region needs to reach eventually. The user-defined coverage value may be determined according to a user's lawn mowing requirement or a user's personal habit or in other manners, and the preset coverage value may be determined by a preset coverage value in the lawn mower that each sub-region needs to reach eventually. As shown in FIG. 11, when the autonomous lawn mower 20 turns to leave the boundary after reaching the boundary, the movement ranges comprise the square 12 to the square 16. Coverage values in the square 12 to the square 16 are respectively 9.1%, 9.1%, 18.2%, 27.2%, and 36.4%. The density of line segments filled in a square corresponds to a coverage value. Denser filled line segments correspond to a larger coverage value. If the coverage value preset in the system is 20%, during turning, the lawn mower 20 may select any one of directions in the square 12 to the square 14 that correspond to 9.1%, 9.1%, and 18.2% respectively to turn. As shown in FIG. 11, the autonomous lawn mower 20 may turn to the square 13. In this embodiment of this application, the preset requirement of the coverage value during turning may be determined in another manner. This is not limited in this application.

In an embodiment of this application, when the lawn mower reaches the boundary, it means that the navigation mechanism 26 reaches the boundary and/or the navigation mechanism 26 reaches a location at a distance from the boundary meeting a preset distance threshold. Preferably, the preset distance threshold between the navigation mechanism 26 and the boundary may be between 20 centimeters and 80 centimeters.

Figure 13:
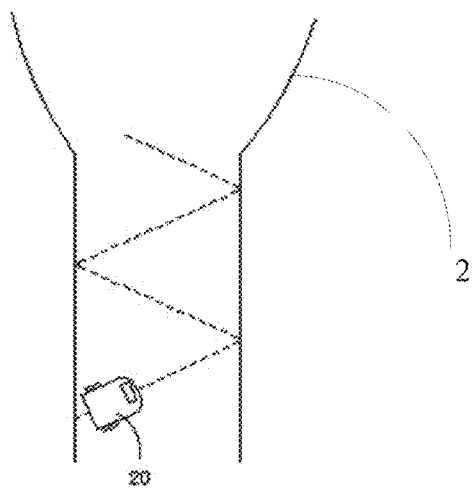
FIG. 13 is a schematic diagram of a method of rapid leaving from a narrow region according to another embodiment of the present invention.

Another path planning manner is further provided in this application. In the path planning manner, the navigation mechanism may further be configured to determine an angular relationship between the movement direction of the autonomous lawn mower 20 and the boundary. After obtaining the angular relationship, the control module may further control, based on the angular relationship, the movement module to turn. When the lawn mower reaches the boundary, the control module may select a direction with an angular relationship of an obtuse angle, and control the lawn mower to turn in the direction of the obtuse angle. As shown in FIG. 8, when the autonomous lawn mower 20 reaches the boundary, an angular relationship between the movement direction of the autonomous lawn mower 20 in the working region and one side of the boundary is an obtuse angle. In this case, in addition to selecting to turn in a direction with a coverage value that meets the requirement, the control module may further select a direction of the obtuse angle and control the movement module to turn in the direction of the obtuse angle. Alternatively, the control module may first select a turning range according to the angular relationship, and select a turning direction according to a coverage value that meets the requirement. Therefore, during turning, in addition to the coverage values corresponding to the movement ranges when the lawn mower reaches the boundary, the lawn mower controls the movement module to turn to a movement range with a coverage value that meets the preset requirement. Further, the lawn mower is controlled, according to the angular relationship between the movement direction of the lawn mower and the boundary, to turn in the direction of the obtuse angle. FIG. 13 is another schematic diagram of rapid leaving from a narrow region in a path planning manner. When the autonomous lawn mower 20 reaches the boundary to turn to leave the boundary, the turning manner based on coverage values and the turning manner an angular relationship provided in this embodiment of this application are combined to control the lawn mower to turn. In this case, the autonomous lawn mower 20 may be controlled by the control module to turn inside the working region, so that the autonomous lawn mower 20 can work evenly in the working region and leave the narrow region rapidly.

Figure 12:
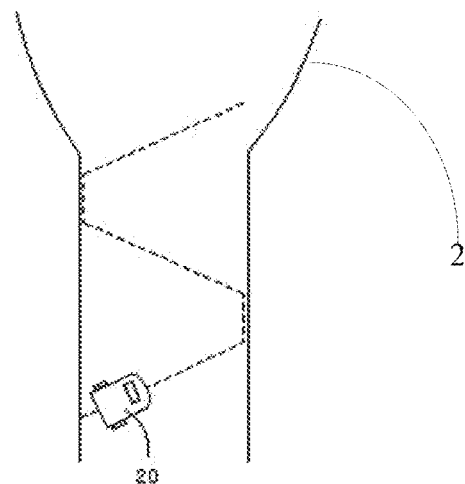
FIG. 12 is a schematic diagram of a method of rapid leaving from a narrow region according to an embodiment of the present invention.

Another path planning manner is further provided in this application. In the path planning manner, after reaching the boundary, the lawn mower may first move along the boundary by a distance, and turn in the foregoing manner based on coverage values or the foregoing manner based on a combination of coverage values and an angular relationship, to implement even mowing in or rapid leaving from the narrow region. FIG. 12 is a schematic diagram of rapid leaving from a narrow region in a path planning manner. When the autonomous lawn mower 20 reaches the boundary to turn to leave the boundary, the autonomous lawn mower 20 first turns a little to make the movement direction the same as a direction of the boundary 2. The autonomous lawn mower 20 then moves along the boundary 2 by a distance. The autonomous lawn mower 20 is then controlled, in the manner of controlling turning based on coverage values provided in this embodiment of this application, to turn to a movement range with a coverage value that meets the preset requirement. In this case, the autonomous lawn mower 20 may turn inside the working region under the control of the control module, thereby rapid leaving from the narrow region. That is, in this embodiment, during turning of the lawn mower, in addition to using the manner of controlling turning based on coverage values provided in this embodiment of this application, the lawn mower may further be controlled to move along the boundary by a distance after turning is started and before turning is finished. Preferably, the distance may be set between 20 cm and 100 cm.

It should be noted that, the boundary 2 in the working region may be generally curved. However, for a specific intersection, for example, an intersection M between the movement direction of the lawn mower and the boundary in FIG. 7, a boundary around the intersection M may be considered as a straight line. in other words, although the boundary may be curved, when the lawn mower reaches a location for turning on the boundary such as the intersection N in FIG. 7, an extending direction of the boundary 2 may be a straight line, and the extending direction is a tangent of the boundary 2.

In this embodiment of the present invention, the movement locations passed by the self-moving device when the self-moving device moves in the working region are recorded by the navigation mechanism, and the coverage values of the self-moving device in each sub-region of the working region are determined based on the movement locations. When the self-moving device reaches the boundary, the control module controls the movement module to turn to leave the boundary, and the control module may control, based on the coverage values corresponding to each movement range when the self-moving device reaches the boundary, the movement module to turn to a movement range with a coverage value that meets the preset requirement. Coverage values in a movement range during turning of the self-moving device are controlled, so that path planning of the self-moving device during movement is implemented, thereby facilitating even work of the self-moving device in a working region and improving the working efficiency of the self-moving device.

Figure 14:
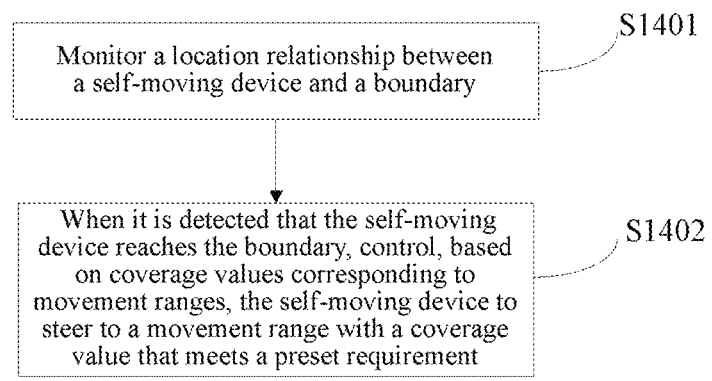
FIG. 14 is a flowchart of a turning method of a lawn mower according to an embodiment of the present invention.

A turning method of an automatic working system is further provided in an embodiment of the present invention. As shown in FIG. 14, the method may comprise the following steps.

S1401: Monitor a location relationship between a self-moving device and a boundary.

S1402: When it is detected that the self-moving device reaches the boundary, control, based on coverage values corresponding to movement ranges, the self-moving device to turn to a movement range with a coverage value that meets a preset requirement.

The self-moving device may move and work in a working region defined by the boundary. The boundary may be an electrical boundary or may be a virtual boundary based on a map.

In an embodiment, the foregoing turning method of the automatic working system may be performed by a controller or a server. The controller may be a controller in the self-moving device or may be a controller disposed in a navigation mechanism. This is not limited in this application.

In an embodiment of this application, before the controlling the self-moving device to turn to a movement range with a coverage value that meets a preset requirement, the method may further comprise: dividing the map of the working region into a plurality of sub-regions; recording movement locations passed by a movement module when the movement module moves in the working region; and determining coverage values of the movement module in the sub-regions of the working region based on the movement locations.

In an embodiment of this application, the controlling the self-moving device to turn to a movement range with a coverage value that meets a preset requirement may comprise: controlling the self-moving device to turn in any one of movement directions in the movement range.

In an embodiment of this application, the method further comprises: determining an angular relationship between the movement direction of the self-moving device and the boundary; and when the self-moving device reaches the boundary, if the angular relationship is an obtuse angle, controlling the self-moving device to turn in a direction of the obtuse angle.

In an embodiment of this application, the movement range may comprise a conical region with a current movement location of the self-moving device being the center and with a preset angle.

In an embodiment of this application, the coverage value corresponding to the movement range is determined based on a coverage value in a sub-region, where a distance between the sub-region and the self-moving device meets a preset distance.

In an embodiment of this application, the coverage value corresponding to the movement range is determined based on a coverage value in a sub-region adjacent to the self-moving device.

In an embodiment of this application, the controlling, based on coverage values corresponding to each movement range, the self-moving device to turn to a movement range with a coverage value that meets a preset requirement may comprise: controlling, based on a sum or an average value of the coverage values in the sub-regions of each movement range, a movement module to turn to a movement range with a coverage value that meets the preset requirement.

In an embodiment of this application, at least one sub-region may be defined by a sub-region boundary, and correspondingly, the movement range of the movement module during turning of the movement module is determined based on a sub-region boundary of a sub-region to which the movement module turns and a current movement location.

In an embodiment of this application, the movement range may comprise a user-defined movement range or a preset movement range.

In an embodiment of this application, the coverage value in the sub-region may be determined based on at least one of the following parameters: a movement time, a quantity of passing times, and a movement path length of the self-moving device in each sub-region.

In an embodiment of this application, the preset requirement may comprise that the coverage value is less than or equal to coverage values corresponding to other movement ranges.

In an embodiment of this application, the preset requirement may comprise that the coverage value is less than or equal to a maximum value of coverage values corresponding to other movement ranges.

In an embodiment of this application, the preset requirement may comprise that the coverage value is less than or equal to a preset coverage value.

In an embodiment of this application, preset coverage value may comprise a user-defined coverage value or a preset coverage value.

In an embodiment of this application, a navigation mechanism may comprise, but is not limited to, at least one of the following: an ultrasonic sensor, a radar sensor, an optical sensor, a UWB sensor, an inertial navigation system, a satellite navigation mechanism, and a visual sensor.

In an embodiment of this application, the navigation mechanism may be fixedly or detachably mounted on the self-moving device.

In this embodiment of the present invention, the movement locations passed by the self-moving device when the self-moving device moves in the working region are recorded by the navigation mechanism, and the coverage values of the self-moving device in the sub-regions of each working region are determined based on the movement locations. When the self-moving device reaches the boundary, the control module controls the movement module to turn to leave the boundary, and the control module may control, based on the coverage values corresponding to each movement range when the self-moving device reaches the boundary, the movement module to turn to a movement range with a coverage value that meets the preset requirement. Coverage values in movement ranges during turning of the self-moving device are controlled, so that path planning of the self-moving device during movement is implemented, thereby facilitating even work of the self-moving device in a working region and rapid leaving from a narrow region and improving the working efficiency of the self-moving device.

An embodiment method of this application is described by using a specific application scenario.

Figure 15:
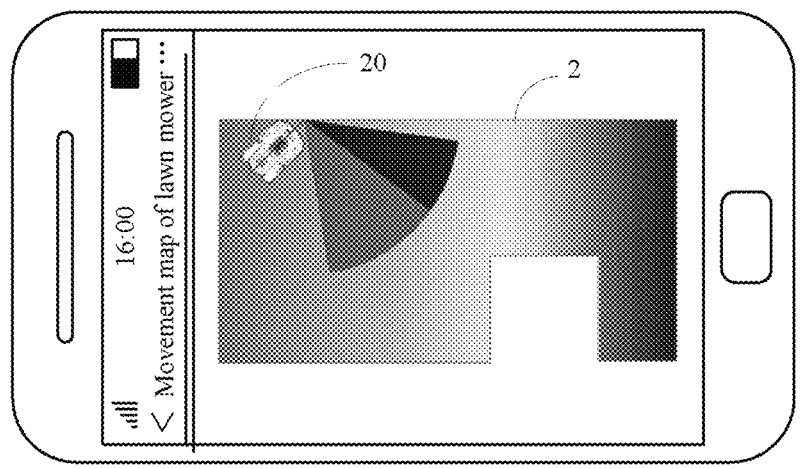
FIG. 15 is a schematic diagram of a scenario according to the present invention.

FIG. 15 shows a user interface of a lawn mower app. A map of a working region is displayed in the user interface. In this example, the working region is an irregular region. On the map displayed in the user interface, coverage values in a working region are represented by different shades, where a darker shade represents a larger coverage value, and a lighter shade represents a smaller coverage value. When the autonomous lawn mower 20 provided with a GPS navigation mechanism works in the working region, a working time of the autonomous lawn mower 20 in each sub-region may be recorded, and a coverage value of the autonomous lawn mower 20 in each sub-region may be determined based on the working time. The coverage value in each sub-region may be updated in real time according to current work. The coverage values updated in real time may be displayed in the user interface with different shades. As shown in FIG. 15, when the lawn mower reaches the boundary, a conical region with a current movement location of the lawn mower being the center and with a preset angle may be used as a movement range, and a working region during turning may be scanned by using the movement range. Therefore, the autonomous lawn mower 20 may select, based on the coverage values in the sub-regions of the working region during turning, a movement range with a coverage value that meets a preset requirement to turn. Specifically, the autonomous lawn mower 20 may select a movement range with a coverage value less than a preset coverage value to turn. Further, the autonomous lawn mower 20 may select any one of movement directions in a movement range that meets the preset requirement to turn.

The foregoing embodiments only show several implementations of the present invention and are described in detail, but they should not be construed as a limitation to the patent scope of the present invention. It should be noted that, a person of ordinary skill in the art may make various variations and improvements without departing from the concept of the present invention. These variations and improvements shall all fall within the protection scope of the present invention. Therefore, the protection scope of the patent of the present invention shall be subject to the appended claims.

The invention claimed is:

1. An automatic working system comprising:
 a self-moving device comprising:
  a housing;
  a movement module, mounted on the housing and configured to drive the self-moving device to move and/or turn; and
  a control module, configured to control the movement module to drive the self-moving device to move and/or turn; and
 a navigation mechanism, configured to record movement locations passed by the self-moving device when the self-moving device moves in a working region, and determine coverage values of the self-moving device in sub-regions of a map of the working region based on the movement locations, wherein:
  when the self-moving device reaches a boundary of the working region, the control module is configured to control the movement module to turn to leave the boundary, and
  based on a coverage value corresponding to each movement range when the self-moving device reaches the boundary, the control module is configured to control the movement module to turn to a movement range with a corresponding coverage value that meets a preset requirement, wherein the coverage value corresponding to each movement range is determined based at least in part on a coverage value of the self-moving device in a corresponding sub-region of the sub-regions.

2. The automatic working system according to claim 1, wherein the control module is configured to control the movement module to turn in any one of movement directions in the movement range.

3. The automatic working system according to claim 1, wherein:
 the navigation mechanism is further configured to determine an angular relationship between a movement direction of the self-moving device and the boundary,
 the control module is further configured to control, based on the angular relationship, the movement module to turn, and when the self-moving device reaches the boundary, and
 if the angular relationship is an obtuse angle, the self-moving device is controlled to turn in a direction of the obtuse angle.

4. The automatic working system according to claim 1, wherein the movement range comprises a conical region with a current movement location of the self-moving device being a center and with a preset angle, the current movement location comprising a movement location when the self-moving device reaches the boundary.

5. The automatic working system according to claim 1, wherein the control module is further configured to determine the coverage value corresponding to the movement range based on a coverage value in at least one sub-region of the sub-regions where a distance between the sub-region and the self-moving device meets a preset distance.

6. The automatic working system according to claim 1, wherein the control module is further configured to determine the coverage value corresponding to the movement range based on a coverage value in a sub-region adjacent to the self-moving device.

7. The automatic working system according to claim 1, wherein the coverage value corresponding to each movement range when the self-moving device reaches the boundary comprises a sum or an average value of the coverage values in sub-regions of each movement range.

8. The automatic working system according to claim 1, wherein each sub-region of the sub-regions is defined by a sub-region boundary, and correspondingly, a movement range of the movement module is determined based on a corresponding sub-region boundary of a sub-region to which the movement module turns and a current movement location.

9. The automatic working system according to claim 1, wherein the movement range comprises a user-defined movement range or a preset movement range.

10. The automatic working system according to claim 1, wherein the coverage values in the sub-regions are determined based on at least one of: a movement time of the self-moving device in each sub-region, a quantity of passing times that the self-moving device passes each sub-region, or a movement path length of the self-moving device in each sub-region.

11. The automatic working system according to claim 1, wherein the preset requirement comprises: the corresponding coverage value being less than or equal to coverage values corresponding to other movement ranges.

12. The automatic working system according to claim 1, wherein the preset requirement comprises: the corresponding coverage value being less than or equal to a maximum value of coverage values corresponding to other movement ranges.

13. The automatic working system according to claim 1, wherein the preset requirement comprises: the coverage value being less than or equal to a preset coverage value.

14. The automatic working system according to claim 13, wherein the preset coverage value comprises a user-defined coverage value or a preset coverage value.

15. The automatic working system according to claim 1, wherein the navigation mechanism comprises at least one of: an ultrasonic sensor, a radar sensor, an optical sensor, an ultra wideband (UWB) sensor, an inertial navigation system, a satellite navigation mechanism, or a visual sensor.

16. The automatic working system according to claim 1, wherein the navigation mechanism is fixedly or detachably mounted on the self-moving device.

17. A self-moving device comprising:
 a housing;
 a movement module, mounted on the housing and configured to drive the self-moving device to move and/or turn;

a control module, configured to control the movement module to drive the self-moving device to move and/or turn; and a navigation mechanism, configured to record movement locations passed by the self-moving device when the self-moving device moves in a working region, and determine a coverage value of the self-moving device in each sub-region of a map of the working region based on the movement locations, wherein:

when the self-moving device reaches a boundary of the working region, the control module is configured to control the movement module to turn to leave the boundary, and based on a coverage value corresponding to each movement range when the self-moving device reaches the boundary, the control module is configured to control the movement module to turn to a movement range with a corresponding coverage value that meets a preset requirement, wherein the coverage value corresponding to each movement range is determined based at least in part on the coverage value of the self-moving device in a corresponding sub-region of the sub-regions.

18. A turning method of a self-moving device, the method comprising:

monitoring a location relationship between the self-moving device and a boundary of a working region; and in response to detecting that the self-moving device reaches the boundary, controlling, based on a coverage value corresponding to each movement range, the self-moving device to turn to a movement range with a coverage value that meets a preset requirement, wherein the coverage value corresponding to each movement range is determined based at least in part on a coverage value of the self-moving device in a corresponding sub-region of the sub-regions, and wherein the turning method further comprises:

dividing a map of the working region into a plurality of sub-regions;

recording movement locations passed by a movement module of the self-moving device when the movement module moves in the working region; and determining the coverage value in each sub-region of the map of the working region based on the movement locations.

* * * * *